(12) United States Patent
Xi et al.

(10) Patent No.: US 11,971,625 B2
(45) Date of Patent: Apr. 30, 2024

(54) DIAPHRAGMS, BACKLIGHT MODULES AND DISPLAY DEVICES

(71) Applicants: Hefei BOE Vision-Electronic Technology Co., Ltd., Anhui (CN); BOE Technology Group Co., Ltd., Beijing (CN)

(72) Inventors: Zuoyan Xi, Beijing (CN); Lushan Xu, Beijing (CN)

(*) Notice: Subject to any disclaimer, the term of this patent is extended or adjusted under 35 U.S.C. 154(b) by 244 days.

(21) Appl. No.: 17/435,271

(22) PCT Filed: Feb. 5, 2021

(86) PCT No.: PCT/CN2021/075654
§ 371 (c)(1),
(2) Date: Aug. 31, 2021

(87) PCT Pub. No.: WO2021/164590
PCT Pub. Date: Aug. 26, 2021

(65) Prior Publication Data
US 2022/0146746 A1 May 12, 2022

(30) Foreign Application Priority Data

Feb. 21, 2020 (CN) .......................... 202020198580.0

(51) Int. Cl.
*G02F 1/1333* (2006.01)
*G02F 1/13357* (2006.01)
*H04R 7/18* (2006.01)

(52) U.S. Cl.
CPC ......... *G02F 1/133608* (2013.01); *H04R 7/18* (2013.01); *G02F 1/133314* (2021.01); *G02F 1/133322* (2021.01); *H04R 2499/15* (2013.01)

(58) Field of Classification Search
CPC .................. G02F 1/133308; G02F 1/1336
See application file for complete search history.

(56) References Cited

FOREIGN PATENT DOCUMENTS

| CN | 203131584 U | 8/2013 |
|---|---|---|
| CN | 103398352 A | * 11/2013 |
| CN | 203731310 U | 7/2014 |
| CN | 109298559 A | 2/2019 |

(Continued)

OTHER PUBLICATIONS

CN2020201985800 first office action.
PCT/CN2021/075654 international search report.

*Primary Examiner* — James A Dudek
(74) *Attorney, Agent, or Firm* — IPro, PLLC

(57) ABSTRACT

This application discloses diaphragms, backlight modules and display devices. According to an example of the present application, a diaphragm includes a diaphragm body; and diaphragm lugs located on edges of the diaphragm body and each having a diaphragm lug hole. The diaphragm lug hole includes a first wall and a second wall opposite to each other. The first wall includes a first protrusion, and the second wall includes a second protrusion. The first protrusion and the second protrusion are arranged in a staggered manner, and a difference between a distance of a top portion of one of the first protrusion and the second protrusion from a wall opposite to the one of the first protrusion and the second protrusion, and a height of another one of the first protrusion and the second protrusion is less than or equal to 0.

15 Claims, 3 Drawing Sheets

(56) References Cited

FOREIGN PATENT DOCUMENTS

| | | | |
|---|---|---|---|
| CN | 209843093 U | | 12/2019 |
| CN | 210835502 U | * | 6/2020 |
| CN | 210835502 U | | 6/2020 |
| CN | 211980041 U | | 11/2020 |
| JP | H0652814 A | | 2/1994 |

* cited by examiner

DIAPHRAGMS, BACKLIGHT MODULES AND DISPLAY DEVICES

TECHNICAL FIELD

This application relates to diaphragms, backlight modules and display devices.

BACKGROUND

A backlight module includes a diaphragm and a back plate. A bent portion is formed on the back plate by punching and bending, or the back plate is provided with a positioning rivet column. The diaphragm includes diaphragm lugs, Each of the diaphragm lugs is provided with a slot, for example, a waist-shaped hole. The slot is sleeved with the bent portion or the positioning rivet column to fix the diaphragm and the back plate. During mechanical tests or transportation, this fixing method may have the problem of causing the diaphragm lugs to fall off.

SUMMARY

In one aspect, the present application provides a diaphragm. The diaphragm includes a diaphragm body, and diaphragm lugs located on edges of the diaphragm body and each having a diaphragm lug hole. The diaphragm lug hole includes a first wall and a second wall opposite to each other. The first wall includes a first protrusion, and the second wall includes a second protrusion. The first protrusion and the second protrusion are arranged in a staggered manner, and a difference between a distance of a top portion of one of the first protrusion and the second protrusion from a wall opposite to the one of the first protrusion and the second protrusion, and a height of another one of the first protrusion and the second protrusion is less than or equal to 0.

In another aspect, the present application discloses a backlight module. The backlight module includes the diaphragm as described above, and a back plate. The back plate includes a back plate body, and back plate lugs inclined to the back plate body. Each of the back plate lugs includes a back plate lug hole penetrating the back plate lug. The back plate lug passes through the diaphragm lug hole. Each of the first protrusion and the second protrusion is inserted into the back plate lug hole.

In still another aspect, the present application discloses a display device. The display device includes the backlight module as described above.

The technical solutions provided by embodiments of the present application have at least the following beneficial effects:

A diaphragm lug includes a first wall and a second wall opposite to each other and having a first protrusion and a second protrusion. The first protrusion and the second protrusion are arranged in a staggered manner. A top portion of the first protrusion is opposite to a top portion of the second protrusion. After the diaphragm lug is assembled with a back plate lug having a back plate lug hole, the back plate lug passes through a diaphragm lug hole, and each of the first protrusion and the second protrusion is inserted into the back plate lug hole, so that the movement of the diaphragm lug in XYZ directions is blocked by the back plate lug, which enables the diaphragm and the back plate to be firmly fixed. The diaphragm will not fall off during its mechanical test or transportation. In addition, the diaphragm will be flatter, and the uniformity of light passing through the diaphragm is improved.

It should be understood that the above general description and the following detailed description are only exemplary and explanatory and are not restrictive of the present application.

BRIEF DESCRIPTION OF THE DRAWINGS

The accompanying drawings, which are incorporated in and constitute a part of this specification, illustrate examples consistent with the present application and, together with the description, serve to explain the principles of the application.

DETAILED DESCRIPTION OF THE EMBODIMENTS

Figure 1:
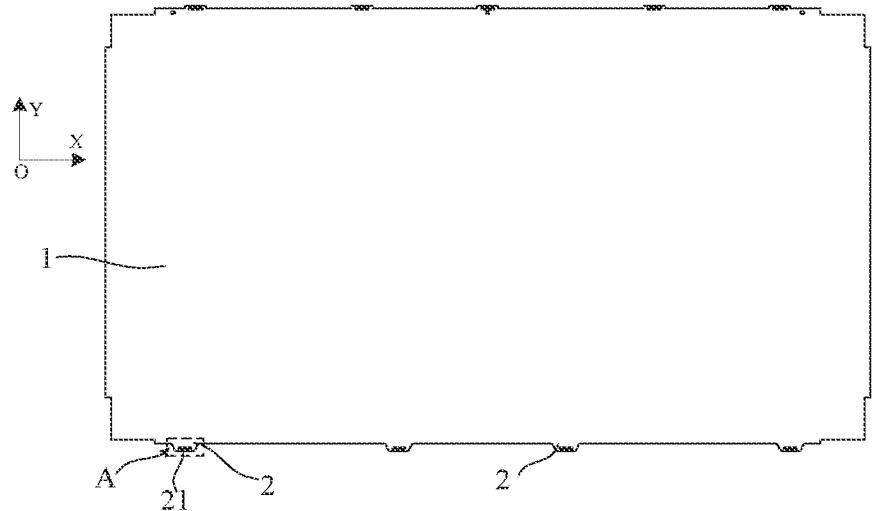
FIG. 1 is a schematic structural diagram illustrating a diaphragm according to an embodiment of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

The terms used in the present application are for the purpose of describing particular examples only, and are not intended to limit the present application. Terms determined by "a", "the" and "said" in their singular forms in the present application and the appended claims are also intended to include plurality, unless clearly indicated otherwise in the context.

It should be understood that "first", "second" and similar words used in the specification and claims of the present application do not represent any order, quantity or importance, but are used only to distinguish different components. Likewise, similar words such as "one", "a" or "an" do not represent a quantity limit, but represent that there is at least one; "plurality" represents two or more. Unless otherwise indicated, similar words such as "front", "rear", "lower" and/or "upper" are only for convenience of description, and are not limited to one position or one spatial orientation. Similar words such as "including" or "comprising" mean that an element or an item appearing before "including" or "comprising" covers elements or items and their equivalents listed after "including" or "comprising", without excluding other elements or items.

The embodiments of the present application will be described below in detail with reference to the drawings. In the case of no conflict, the following embodiments and features therein can be supplemented or combined with each other.

Figure 2:
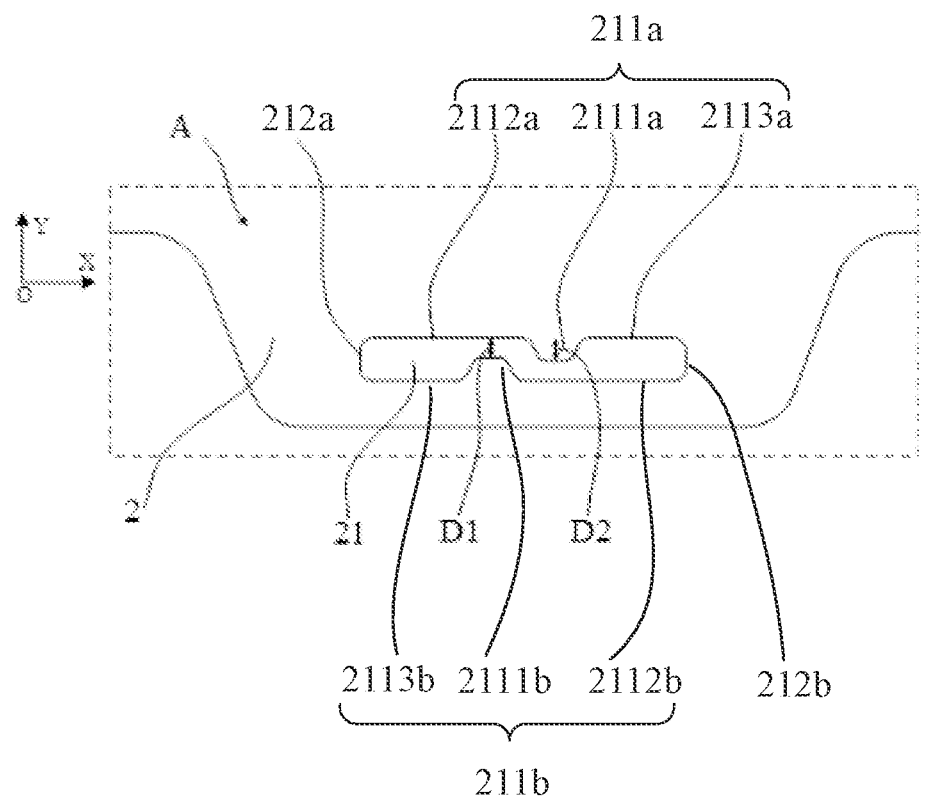
FIG. 2 is an enlarged view illustrating part A in FIG. 1.

Referring to FIGS. 1 and 2, a diaphragm includes a diaphragm body 1 and diaphragm lugs 2 located on edges of the diaphragm body 1. In FIG. 1, the diaphragm lugs 2 are arranged respectively on opposite side edges of the diaphragm body 1, and the diaphragm lugs 2 have the same structure. A part of diaphragm lugs in other embodiments may use the diaphragm lugs 2 in this embodiment. Each of the diaphragm lugs 2 includes a diaphragm lug hole 21. The diaphragm lug hole 21 includes opposite walls 211a and 211h having protrusions 2111a and 2111b, respectively. In an embodiment, the diaphragm lug hole 21 can be a long hole, and includes opposite walls 211a and 211b, and diaphragm connecting walls 212a and 212b connected to the opposite walls 211a and 211h. The wall 211a includes the protrusion 2111a, and a first sub-wall 2112a and a second sub-wall 2113a located on both sides of the protrusion 2111a. The wall 211b includes the protrusion 2111b, and a third sub-wall 2112b and a fourth sub-wall 2113b located on both sides of the protrusion 2111b. In an embodiment, as shown in FIG. 1, the first sub-wall 2112a and the second sub-wall 2113a have an equal distance from the edge of the diaphragm body 1, and the third sub-wall 2112h and the fourth sub-wall 2113b have an equal distance from the edge of the diaphragm body 1. The two protrusions 2111a and 2111b are arranged in a staggered manner, and a top portion of the protrusion 2111a is opposite to a top portion of the protrusion 2111b. The "opposite" means that a difference between a distance of the top portion of one of the protrusions 2111a, 2111b from a wall opposite to the one protrusion, and a height of the other protrusion is less than or equal to 0. As shown in FIG. 2, a distance of the top portion of the protrusion 2111b from the first sub-wall 2112a is marked as D1, and a distance (which can be considered as a height of the protrusion 2111a) of the top portion of the protrusion 2111a from the first sub-wall 2112a is marked as D2. where D1−D2≤0.

Figure 3:
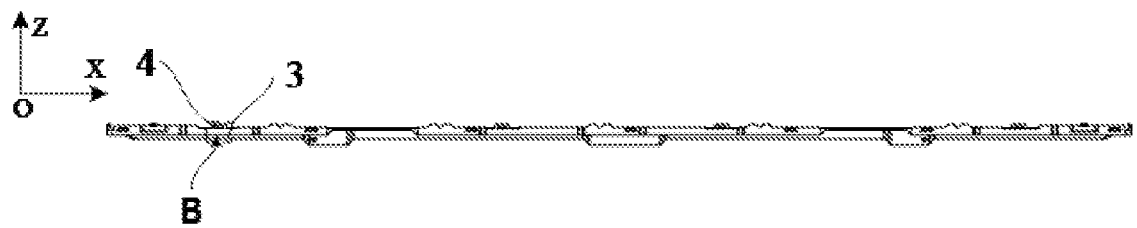
FIG. 3 is a schematic structural diagram illustrating a back plate according to an embodiment of the present application.
Figure 4:
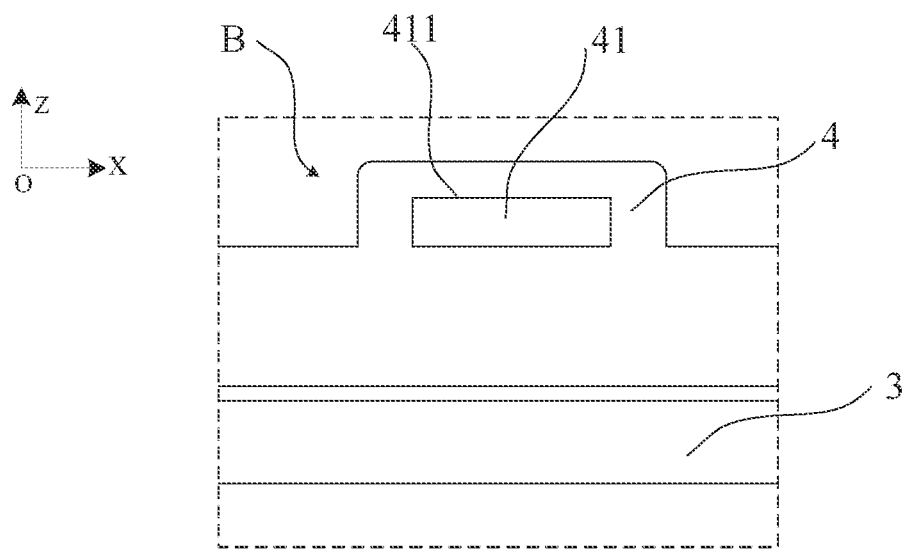
FIG. 4 is an enlarged view illustrating part B in FIG. 3.

Referring to FIGS. 3 and 4, a back plate includes a back plate body 3 and back plate lugs 4 inclined to the back plate body 3. In this embodiment, the back plate lugs 4 are inclined to the back plate body 3, which means that the back plate lugs 4 are perpendicular to the back plate body 3. Each of the back plate lugs 4 includes a back plate lug hole 41 penetrating the back plate lug 4.

Figure 5:
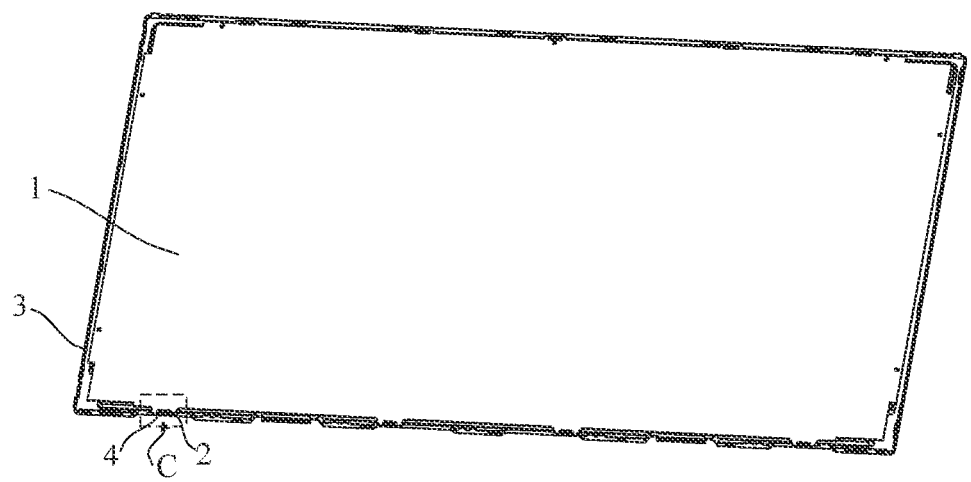
FIG. 5 is a schematic diagram illustrating an assembly formed by assembling a diaphragm and a back plate according to an embodiment of the present application.
Figure 6:
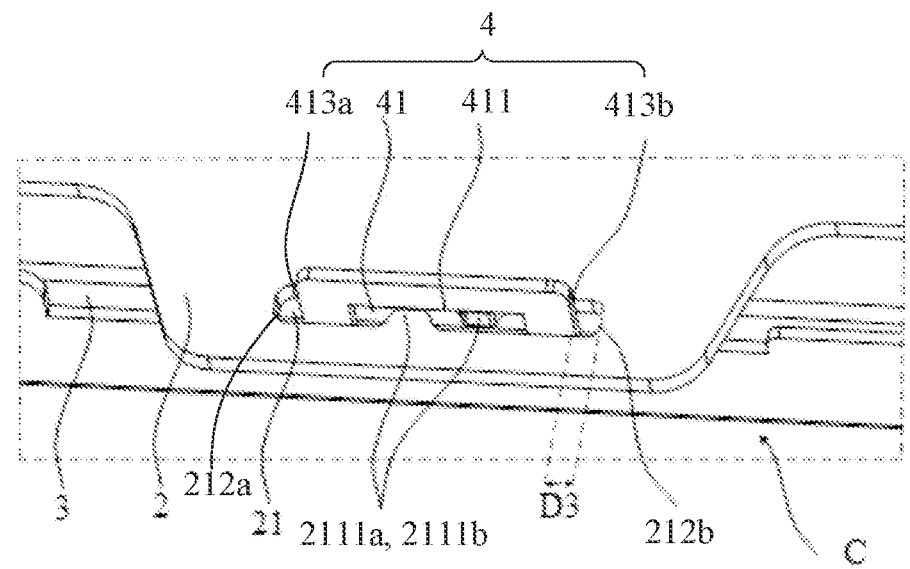
FIG. 6 is an enlarged view illustrating part C in FIG. 5.

Referring to FIG. 6 and in conjunction with FIGS. 1 to 5, 7 and 8, after the back plate lug 4 and the diaphragm lug 2 are assembled, the back plate lug 4 passes through the diaphragm lug hole 21, and each of the protrusions 2111a and 2111b is inserted into the back plate lug hole 41. In this way, the diaphragm lug 2 and the back plate lug 4 are intersect, so that the movement of the diaphragm lug 2 in XYZ directions (the diaphragm is substantially square, a plane where the diaphragm is located is parallel to a plane defined by the XY directions, and the Z direction is a direction perpendicular to a surface of the diaphragm is blocked by the back plate lug, 4. Since the back plate lug 4 passes through the diaphragm lug hole 21, the movement of the diaphragm in the XY directions is restricted by the back plate lug 4. Since the top portions of the two protrusions 2111a and 2111b are opposite to each other, and each of the protrusions 2111a and 2111b is inserted into the back plate lug hole 41, the back plate lug 4 blocks the two protrusions 2111a and 2111b to limit the movement of the diaphragm in the Z direction. As a result, the diaphragm and the back plate are firmly fixed, and the diaphragm will not fall off during its mechanical test or transportation. In addition, the diaphragm will be flatter, and the uniformity of light passing through the diaphragm is improved.

Continuing to refer to FIGS. 1 and 2, in an embodiment, the top portion of the protrusion 2111a is opposite to the top portion of the protrusion 2111b, including: a distance between the top portion of the protrusion 2111a and the top portion of the protrusion 2111b is 0-0.2 mm. As shown in FIG. 2, an absolute value of D2−D1 or D1−D2 is 0-0.2, such as 0 mm, 0.02 mm, 0.03 mm, 0.05 mm, 0.08 mm, 0.1 mm, 0.12 mm, 0.15 mm, 0.16 mm, 0.18 mm or 0.2 mm. In a case where the top portions of the two protrusions 2111a and 2111b are opposite to each other, and the distance between the top portions of the two protrusions 2111a and 2111b is 0 mm~0.2 min, not only the diaphragm lug 2 and the back plate lug 4 are made easier to be assembled, but also the diaphragm lug 2 can be better blocked by the back plate lug 4 in the Z direction, so that the diaphragm and the back plate are more firmly fixed, and the diaphragm is not easy to fall off In addition, the diaphragm will be flatter, and the uniformity of light passing through the diaphragm is improved.

Continuing to refer to FIGS. 1 and 2, in an embodiment, a distance between the protrusion 2111a and a center line of the diaphragm lug hole 21 is less than or equal to a distance between the protrusion 2111a and the diaphragm connecting wall 212a of the diaphragm lug hole 21, and a distance between the protrusion 2111b and the center line of the diaphragm lug hole 21 is less than or equal to a distance between the protrusion 2111b and the diaphragm connecting wall 212b of the diaphragm lug hole 21. The center line is a straight line passing through a center of the diaphragm lug hole 21 and parallel to the plane where the diaphragm is located. In this embodiment, the two protrusions 2111a and 2111b are closer to the middle of the diaphragm lug hole 21, and the diaphragm and the back plate are easily assembled. The diaphragm and the back plate are more firmly fixed, and the diaphragm is not easy to fall off. In addition, the diaphragm will be flatter, and the uniformity of light passing through the diaphragm is improved. In another embodiment, a distance between the two protrusions 2111a and 2111b is less than ½ of a length of the diaphragm lug hole 21. For example, if the distance between the two protrusions 2111a and 2111b is L1, and the length of the diaphragm lug hole 21 is L2, a relationship between the L1 and the L2 can be L1≤1/3×L2, L1≤1/4×L2, L1≤1/5×L2, L1≤2/5×L2, or L1<1/2×L2. The closer the two protrusions 2111a and 2111b are, the less easily the diaphragm falls off. As a result, the diaphragm and the back plate are more firmly fixed, and the diaphragm lug 2 and the back plate lug 4 are easily assembled.

Continuing to refer to FIGS. 1 and 2, in an embodiment, a width of each of the protrusions 2111a and 2111b in a length direction of the diaphragm lug hole 21 is gradually decreased from its bottom portion to its top portion. As shown in FIGS. 1 and 2, the length direction of the diaphragm lug hole 21 refers to the X direction, and a direction of the protrusion 2111a or 2111b from its bottom portion to its top portion refers to the Y direction. That is, the width of the protrusion 2111a or 2111b is gradually decreased in the Y direction. Projections of the protrusions 2111a and 2111b on an XY plane include a triangle, an arch, a trapezoid, or a trapezoid-like shape. The trapezoid-like shape refers to that connection of a wall of the protrusion 2111a with the first sub-wall 2112a and the second sub-wall 2113a, and connection of a wall of the protrusion 2111b with the third sub-wall 2112b and the fourth sub-wall 2113b are implemented in a rounded manner or the like, so that the protrusions 2111a and 2111b look like trapezoids as a whole. By gradually decreasing the widths of the protrusions 2111a and 2111b in the X direction from their respective bottom portions to top portions, the top portions of the protrusions 2111a and 2111b are softer than their bottom portions, which not only facilitates the diaphragm lug 2 and the back plate lug 4 to be assembled, but also enables the diaphragm lug 2 and the back plate lug 4 to be more firmly fixed.

Continuing to refer to FIGS. 1 and 2, in an embodiment, a maximum width of each of the protrusions 2111a and 2111b in the length direction of the diaphragm lug hole 21 is less than or equal to ½ of the distance between the protrusions 2111a and 2111b, which facilitates the diaphragm lug hole 21 to be processed, and enables the diaphragm lug 2 and the back plate lug 4 to be more firmly fixed. In a case where this embodiment is combined with the manner in which the width of each of the protrusions 2111a and 2111b in the length direction of the diaphragm lug hole 21 is gradually decreased from its bottom portion to its top portion, the diaphragm lug 2 and the back plate lug 4 can be easily assembled.

Continuing to refer to FIGS. 6 and 4 and in conjunction with FIGS. 3, 5, 7 and 8, in an embodiment, the diaphragm lug hole 21 includes the diaphragm connecting walls 212a and 212b connected to the opposite walls 211a and 211b, and the back plate lug hole 41 includes back plate lug outer walls 413a and 413b facing the diaphragm connecting walls 212a and 212h of the diaphragm lug hole 21. Distances D3 of the back plate lug outer wall 413a from the diaphragm connecting wall 212a, and the back plate lug outer wall 413b from the diaphragm connecting wall 212b are 1 mm~1.5 mm, such as 1 mm, 1.1 mm, 1.2 mm, 1.3 mm, 1.4 mm or 1.5 mm. Generally, there are a plurality of diaphragm lugs 2 on the diaphragm to be assembled with corresponding back plate lugs 4. Since a distance between a back plate lug outer wall and a diaphragm connecting wall that the back plate lug outer wall faces is 1 mm~1.5 mm, When the diaphragm and the back plate are assembled, this distance facilitates adjustment on a position between the diaphragm lug 2 and the back plate lug 4, and in a case of ensuring that the diaphragm lug 2 and the back plate lug 4 are firmly fixed, the diaphragm and the back plate are easily assembled.

Figure 7:
FIG. 7 is a view illustrating an assembly in an XZ plane according to an embodiment of the present application.
Figure 8:
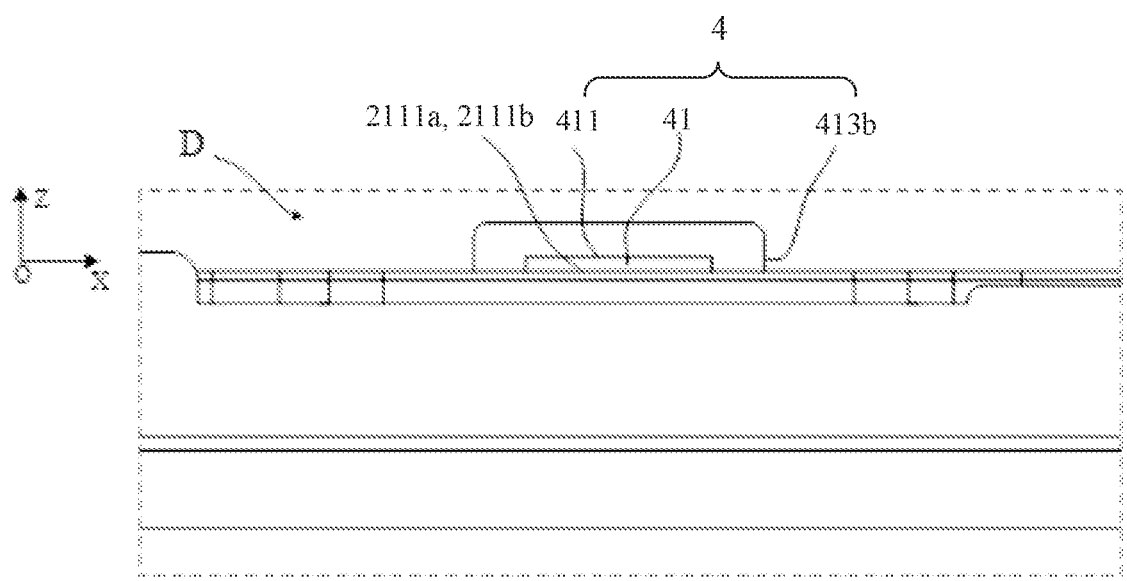
FIG. 8 is an enlarged view illustrating part D in FIG. 7.

Referring to FIGS. 8, 4 and 6 and in conjunction with FIGS. 3, 5 and 7, in an embodiment, the back plate lug hole 41 includes a back plate connecting wall 411 facing the protrusions 2111a and 2111b, and distances of the protrusions 2111a and 2111b from the back plate connecting wall 411 are less than or equal to 0.5 mm. That is, the distances of the protrusions 2111a and 2111b from the back plate connecting wall 411 in the Z direction are less than or equal to 0.5 mm, such as 0.02 mm, 0.05 mm, 0.08 mm, 0.1 mm, 0.12 mm, 0.15 mm, 0.18 mm, 0.2 mm, 0.23 mm, 0.25 mm, 0.28 mm, 0.3 mm, 0.35 mm, 0.38 mm, 0.4 mm, 0.42 mm, 0.43 mm, 0.45 mm, 0.48 mm or 0.5 mm. In this embodiment, the diaphragm lug 2 and the diaphragm body 1 are coplanar. In this way, the distances of the protrusions 2111a and 2111b from the back plate connecting wall 411 can be regarded as a distance of the surface of the diaphragm from the back plate connecting wall 411. In a case where the distances of the protrusions 2111a and 2111b from the back plate connecting wall 411 in the Z direction are less than or equal to 0.5 mm, the diaphragm will not shake, which further enables the diaphragm and the back plate to be firmly fixed. In addition, the diaphragm will be flatter, and the uniformity of light passing through the diaphragm is improved.

This application further discloses a display device. The display device includes any backlight module as described above. The display device has at least the advantages of the backlight module.

The above descriptions are only the preferred embodiments of the present application, and do not limit the application in any form. Although the application has been disclosed in the preferred embodiments, it is not intended to limit the application. Any person skilled in the art, without departing from the scope of the technical solutions of the present application, can make some changes or modifications to the technical contents disclosed above as equivalent embodiments with equivalent changes. However, without departing from the contents of the technical solutions of the present application, any simple revisions, equivalent changes and modifications made to the above embodiments based on the technical essence of the present application still fall within the scope of the technical solutions of the present application.

The invention claimed is:

1. A diaphragm, comprising:
a diaphragm body; and
diaphragm lugs located on edges of the diaphragm body and each having a diaphragm lug hole, wherein
the diaphragm lug hole comprises a first wall and a second wall opposite to each other,
the first wall comprises a first protrusion, and the second wall comprises a second protrusion,
the first protrusion and the second protrusion are arranged in a staggered manner, and
a difference between a distance of a top portion of one of the first protrusion and the second protrusion from a wall opposite to the one of the first protrusion and the second protrusion, and a height of another one of the first protrusion and the second protrusion is less than or equal to 0;
wherein the difference between the distance of the top portion of one of the first protrusion and the second protrusion from the wall opposite to the one of the first protrusion and the second protrusion, and the height of another one of the first protrusion and the second protrusion is less than or equal to 0 comprises: a distance between a top portion of the first protrusion and a top portion of the second protrusion is 0 mm~0.2 mm.

2. The diaphragm according to claim 1, wherein
the diaphragm lug hole comprises a first diaphragm connecting wall and a second diaphragm connecting wall which are connected to the first wall and the second wall,
a distance between the first protrusion and a center line of the diaphragm lug hole is less than or equal to a distance between the first protrusion and the first diaphragm connecting wall,
a distance between the second protrusion and the center line of the diaphragm lug hole is less than or equal to a distance between the second protrusion and the second diaphragm connecting wall.

3. The diaphragm according to claim 1, wherein a width of each of the first protrusion and the second protrusion in a length direction of the diaphragm lug hole is gradually decreased from its bottom portion to top portion.

4. The diaphragm according to claim 1, wherein a maximum width of each of the first protrusion and the second protrusion in a length direction of the diaphragm lug hole is less than or equal to ½ of a distance between the first protrusion and the second protrusion.

5. A backlight module, comprising:
the diaphragm according to claim 1; and
a back plate comprising:
    a back plate body; and
    back plate lugs inclined to the back plate body,
wherein each of the back plate lugs comprises a back plate lug hole penetrating the back plate lug,
the back plate lug passes through the diaphragm lug hole,
each of the first protrusion and the second protrusion is inserted into the back plate lug hole.

6. The backlight module according to claim 5, wherein
the back plate lug hole comprises a back plate connecting wall facing the first protrusion and the second protrusion, and
distances of the first protrusion and the second protrusion from the back plate connecting wall are less than or equal to 0.5 mm.

7. The backlight module according to claim 5, wherein
the diaphragm lug hole comprises a first diaphragm connecting wall and a second diaphragm connecting wall which are connected to the first wall and the second wall,
the back plate lug comprises a first back plate lug outer wall facing the first diaphragm connecting wall and a second back plate lug outer wall facing the second diaphragm connecting wall,
distances of the first back plate lug outer wall from the first diaphragm connecting wall, and the second back plate lug outer wall from the second diaphragm connecting wall are 1 mm~1.5 mm.

8. A display device, comprising: the backlight module according to claim 5.

9. The diaphragm according to claim 2, wherein a width of each of the first protrusion and the second protrusion in a length direction of the diaphragm lug hole is gradually decreased from its bottom portion to top portion.

10. The diaphragm according to claim 2, wherein a maximum width of each of the first protrusion and the second protrusion in a length direction of the diaphragm lug hole is less than or equal to ½ of a distance between the first protrusion and the second protrusion.

11. A backlight module, comprising:
the diaphragm according to claim 2; and
a back plate comprising:
    a back plate body; and
    back plate lugs inclined to the back plate body,
wherein each of the back plate lugs comprises a back plate lug hole penetrating the back plate lug,
the back plate lug passes through the diaphragm lug hole,
each of the first protrusion and the second protrusion is inserted into the back plate lug hole.

12. A backlight module, comprising:
the diaphragm according to claim 3; and
a back plate comprising:
    a back plate body; and
    back plate lugs inclined to the back plate body,
wherein each of the back plate lugs comprises a back plate lug hole penetrating the back plate lug,
the back plate lug passes through the diaphragm lug hole,
each of the first protrusion and the second protrusion is inserted into the back plate lug hole.

13. A backlight module, comprising:
the diaphragm according to claim 4; and
a back plate comprising:
    a back plate body; and
    back plate lugs inclined to the back plate body,
wherein each of the back plate lugs comprises a back plate lug hole penetrating the back plate lug,
the back plate lug passes through the diaphragm lug hole,
each of the first protrusion and the second protrusion is inserted into the back plate lug hole.

14. A backlight module, comprising:
the diaphragm according to claim 9; and
a back plate comprising:
    a back plate body; and
    back plate lugs inclined to the back plate body,
wherein each of the back plate lugs comprises a back plate lug hole penetrating the back plate lug,
the back plate lug passes through the diaphragm lug hole,
each of the first protrusion and the second protrusion is inserted into the back plate lug hole.

15. The backlight module according to claim 6, wherein
the diaphragm lug hole comprises a first diaphragm connecting wall and a second diaphragm connecting wall which are connected to the first wall and the second wall,
the back plate lug comprises a first back plate lug outer wall facing the first diaphragm connecting wall and a second back plate lug outer wall facing the second diaphragm connecting wall,
distances of the first back plate lug outer wall from the first diaphragm connecting wall,
and the second back plate lug outer wall from the second diaphragm connecting wall are 1 mm~1.5 mm.

\* \* \* \* \*

UNITED STATES PATENT AND TRADEMARK OFFICE
CERTIFICATE OF CORRECTION

PATENT NO. : 11,971,625 B2  
APPLICATION NO. : 17/435271  
DATED : April 30, 2024  
INVENTOR(S) : Zuoyan Xi et al.

Page 1 of 1

It is certified that error appears in the above-identified patent and that said Letters Patent is hereby corrected as shown below:

On the Title Page

Enter Item (73) Assignees:  
HEFEI BOE VISION-ELECTRONIC TECHNOLOGY CO, LTD.,  
HEFEI, ANHUI (CN)  
BOE TECHNOLOGY GROUP CO, LTD.,  
BEIJING (CN)

Signed and Sealed this  
Second Day of July, 2024

Katherine Kelly Vidal  
*Director of the United States Patent and Trademark Office*